(12) United States Patent
Kawai

(10) Patent No.: US 6,570,937 B1
(45) Date of Patent: May 27, 2003

(54) FREQUENCY SCANNING FSK RECEIVER

(75) Inventor: Kazuo Kawai, Tokyo (JP)

(73) Assignee: General Research of Electronics, Inc., Tokyo (JP)

( * ) Notice: Subject to any disclaimer, the term of this patent is extended or adjusted under 35 U.S.C. 154(b) by 0 days.

(21) Appl. No.: 09/312,779

(22) Filed: May 17, 1999

(30) Foreign Application Priority Data

Jun. 12, 1998 (JP) .......................................... 10-181399

(51) Int. Cl.⁷ ................................................ H03D 3/00
(52) U.S. Cl. ....................................................... 375/334
(58) Field of Search ................................ 375/334, 335, 375/336, 337; 455/161.1, 161.3, 164.1

(56) References Cited

U.S. PATENT DOCUMENTS 4,897,857 A * 1/1990 Wakatsuki et al. ............ 327/72

* cited by examiner

*Primary Examiner*—Stephen Chin
*Assistant Examiner*—Kevin Kim
(74) *Attorney, Agent, or Firm*—Flynn, Thiel, Boutell & Tanis, P.C.

(57) ABSTRACT

A frequency scanning receiver for a FSK signal of such a type that a center frequency is provided in an overhead portion of a packet. The receiver is constructed so that a remaining center level error, when the FSK signal is found by frequency scanning of a local oscillator, can be set to substantially zero even when frequency scanning is done quickly. In the receiver, a conversion point detector detects a time point when a demodulated base band signal having a center frequency output from a center frequency detector is scanned by a VFO and then crosses over a zero point in a comparator. At the time point a scanning voltage is held and is corrected by a correcting voltage from a correcting signal generating circuit, whereby an overpassing quantity corresponding to a scanning speed and a loop delay time of a system of the receiver can be corrected.

4 Claims, 2 Drawing Sheets

FREQUENCY SCANNING FSK RECEIVER

CROSS REFERENCE TO RELATED PATENTS

This application is related to U.S. Pat. No. 6,396,882 issued May 28, 2002, based on U.S. patent application Ser. No. 09/259,663, filed Feb. 26, 1999.

FIELD OF THE INVENTION

The present invention relates to an improvement of techniques for constructing a receiver circuit for receiving a packet FSK (Frequency Shift Keying) signal by a receiver having frequency scanning faculty.

DESCRIPTION OF THE PRIOR ART

There are various kinds of FSK signals that include packets. One of them is a packet signal of such type that a center frequency is provided in a head or an overhead portion of the packet.

For a FSK signal of a packet type having frequency error, in general, first frequency scanning of a local oscillator is done and then, when the IF (Intermediate Frequency) frequency of a received signal obtained thereby comes within the pass band of an IF filter, a carrier detector detects this situation to stop the frequency scanning. However, at this time, ordinarily, the frequency of the IF signal does not coincide with that of an object signal, so frequency error remains. So, it is necessary to remove this frequency error by causing an AFC (Automatic Frequency Control) circuit to operate at the same time while stopping frequency scanning or to correct a DC offset component provided in a base band portion owing to remaining frequency error by a suitable correcting circuit.

Various correcting circuits for a signal having such packet construction that a bit synchronizing signal is provided in an overhead portion of the packet are proposed to attain the above mentioned object.

Following are known correcting methods employed in these correcting circuits.

As representatives thereof there are known 1) a method in which there are disposed a positive and a negative peak hold circuit and the center level is obtained, starting from an average of peak values held therein; 2) a method in which there are disposed a positive and a negative dead zone circuit having dead zone voltage widths, which are in accordance with a positive and a negative peak value width, respectively, of the base band signal, and the center error is obtained by taking out components output, exceeding these dead zone voltage widths, in the base band signal; 3) a method in which the center level is obtained by integrating a bit synchronizing signal, which is at a beginning of the packet signal, over a 2 bit length (a period of time of 2/baud sec (baud being transmission speed)); 4) a method in which the bit synchronizing signal is sampled twice with an interval of 1/baud sec and the center level is obtained, starting from an average of these sampled values; etc.

Since these methods are correcting methods suitable for a packet signal having only a true FSK signal without a center frequency signal in a head thereof, the frequency error of the FSK signal can not be corrected by method (1) or (2), but can be corrected roughly by method (3) or (4).

However, in a case that center frequency can be used, since center frequency error is obtained directly, it is apparent that a correcting circuit can be constructed more simply by other correcting methods than method (3) or (4).

As such method, we filed U.S. patent application Ser. No. 09/259,633 on Feb. 26, 1999, now U.S. Pat. No. 6,396,882, corresponding to Japanese Patent Application No. 10-150685 in which, when a center frequency signal in a head of a packet is demodulated by frequency scanning to provide a base band signal and this base band signal passes through a judgment threshold for a FSK signal, this passing moment is detected to render a scanning frequence of a scanning oscillator hold and at the same time, scanning stop.

However, according to this correct method, it is necessary to take response times of a threshold passing detection circuit, a hold control circuit and a hold circuit itself until the scanning oscillator is held after the base band signal passes through the threshold. Further, the scanning oscillator produces a scanning signal having a frequency which leads by a signal transmission delay time (a delay time from the scanning oscillator to a frequency discriminator) already when it is detected that the base band signal passes through the threshold. Accordingly, according to the above mentioned method, a frequency which overpasses by all response times of a system (a loop delay time) from a true central frequency is set and held. If this overpassing quantity of the set frequency is large, demodulation margin reduces, or if a scanning speed is slowed down to make it be small, it is necessary to set a long duration to issue the center frequency and as a result, through-put of transmission data reduces.

SUMMARY OF THE INVENTION

An object of the invention is to provide a frequency scanning FSK receiver capable of holding a correct scanning frequency which coincides with said center frequency irrespective of the loop delay time of a receiver system owing to response times of a threshold passing detection circuit (a converting point detector), a hold control circuit and a hold circuit, and transmission time of an IF amplifier in order to solve the above mentioned problem.

In order to attain the above object, the present invention is characterized by a frequency scanning receiver for a FSK signal of a packet type, the packet having a duration when center frequency is provided in a head portion thereof. A conversion point detecting means detects a time point when a demodulated base band signal obtained by demodulating the FSK signal passes through a conversion point at a time of the duration; holding means for holding a scanning voltage to scan the FSK signal at the time point; and correcting means for providing a correction signal having an overpassing quantity of scan corresponding to a loop delay time of a system of the receiver and a scanning speed.

In the above frequency scanning receiver of the invention said conversion point detecting means may comprise a comparator for comparing the demodulated base band signal with a reference voltage. A carrier detector for detecting existence of said demodulated base band signal or an IF signal, a conversion point detector for detecting inversion of an output of the comparator at the time point and a flip-flop circuit set by an output of the conversion point detector and reset by an output of the carrier detector provided when there is no demodulated base band signal or IF signal, and said holding means may include a hold circuit for holding sample value of the scanning voltage in response to a set output of said flip-flop circuit, and wherein said correcting means comprises a flip-flop circuit for latching the output of said comparator or a scanning direction-signal until end of a packet, a weighting circuit for weighting an output of said flip-flop circuit and a circuit for adding an output correcting-voltage of said weighting circuit to said scanning voltage.

Further in the above frequency scanning receiver may comprise a rectangular wave signal generator and an integrator for integrating the rectangular wave signal from said generator to provide the scanning voltage, the rectangular wave signal being used as said scanning direction signal.

DESCRIPTION OF THE PREFERRED EMBODIMENTS

In a frequency scanning receiver for a packet FSK signal of such type that a duration to issue a center frequency is provided in a head portion of a packet, ordinarily, frequency scanning is done by applying a sawtooth voltage (a scanning signal) to a variable frequency oscillator (VFO) as a local oscillator. If there is a center frequency in a received signal, a moment (a conversion time point) at which a center level of a demodulated base band signal outputted from a frequency discriminator becomes zero exists on the way of this frequency scanning. In the present invention said conversion time point is detected to hold a scanning voltage thereat and the overpassing quantity of the held scanning frequency is corrected as follows.

That is, a loop delay time of said receiver system is established as soon as design of all circuits of said receiver system is completed. In this case, if the scanning speed in an output of the frequency discriminator is ±P (volt/sec) and said loop delay time ia T (sec), said overpassing quantity of the held scanning frequency is P.T (volt). Therefore, if the threshold (the conversion point) is O (volt) and the scanning voltage outputted from the scanning oscillator when the base band signal coincides with this threshold is E (volt), a scanning voltage applied to the VFO is corrected so that it may be E±P·T (volt) and it is held until end of a packet, so that since the scanning oscillator is held to provide a correct scanning frequency, a center frequency error can be made zero.

Hereinbelow an embodiment of the present invention will be explained, referring to drawings.

Figure 1:
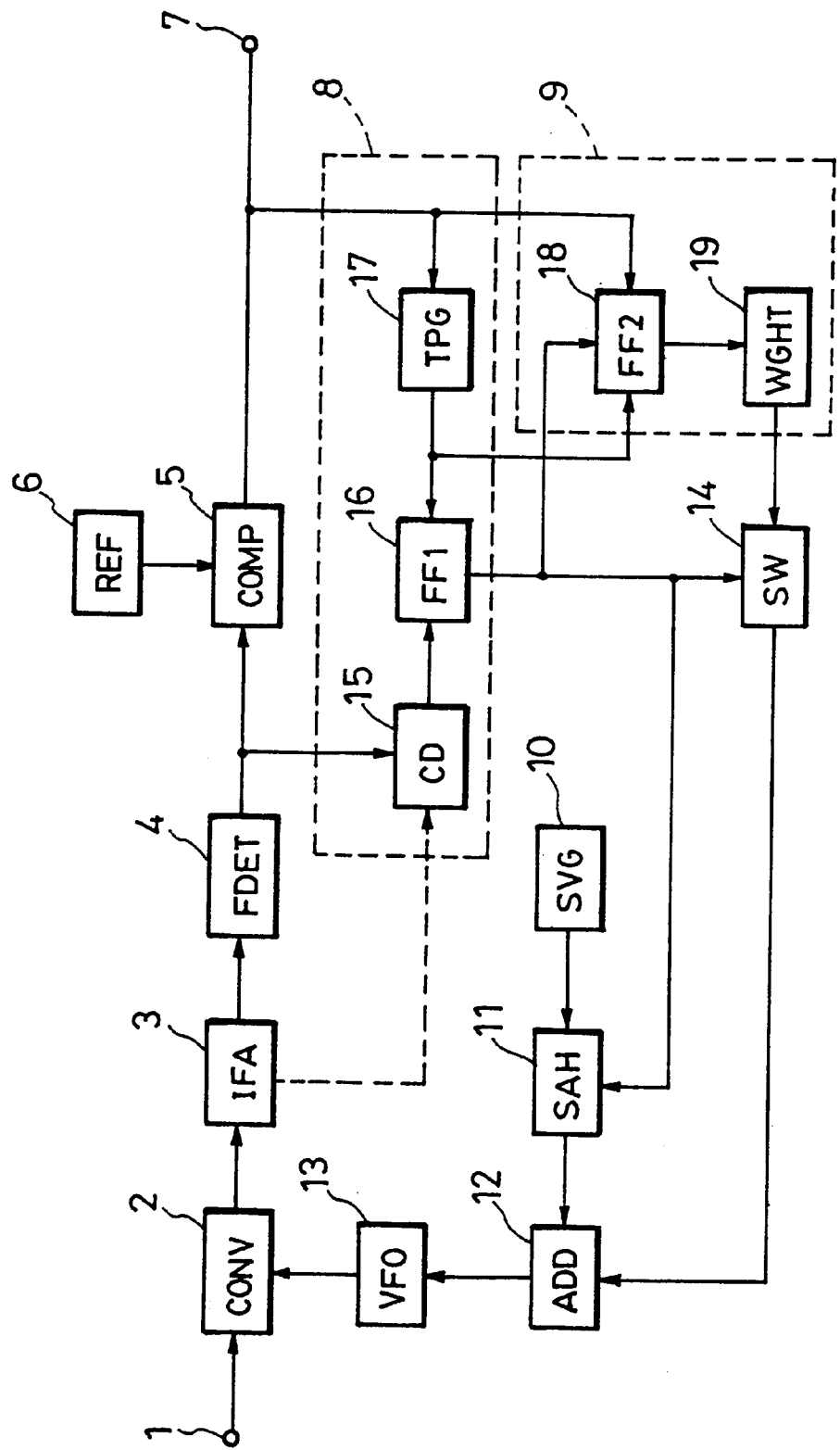
FIG. 1 is a block diagram showing an embodiment of the present invention.

FIG. 1 is a circuit construction diagram of a frequency scanning receiver according to the invention. In FIG. 1, reference numeral 1 is an input terminal for a packet signal having a radio frequency or an intermediate frequency, 2 is a frequency converter (CONV), 3 is an intermediate frequency amplifier (IFA), 4 is a frequency discriminator, 5 is a comparator (COMP), 6 is a reference voltage generator (RFG), 7 is an output terminal for a demodulated base band signal, 8 is a zero cross detecting circuit, 9 is a correction signal generating circuit, 10 is a scanning voltage generator SVG, 11 is a sample & hold circuit SAH, 12 is an adder, 13 is a variable frequency oscillator VFO as a frequency converting local oscillator, 14 is a switch circuit SW, 15 is a carrier detector CD, 16 is a flip-flop circuit FF1, 17 is a conversion point detector TPG, 18 is a flip-flop circuit FF2, 19 is a weighting circuit WGHT.

Firstly, a packet signal having a radio frequency or a first intermediate frequency is applied to the input terminal 1 and is converted to an intermediate frequency signal by the frequency converter 2. After the intermediate frequency signal is amplified by the intermediate frequency amplifier 3, it is detected by the frequency detector 4 to provide a base-band signal. This base band signal is applied to the carrier detector 15, in which it is judged whether the signal is inputted or not, and when the signal is not inputted thereto, the flip-flop circuit 16 is reset. This carrier detection may be done by using the intermediate frequency signal from IFA 3 as shown with a dotted line in FIG. 1.

When the flip-flop circuit 16 is reset, the sample & hold circuit 11 outputs an output scanning voltage (for example, a sawtooth voltage) from the scanning voltage generator 11 and the variable frequency oscillator 13 is driven by it to do said frequency scanning.

When a packet signal having a center frequency in a head portion thereof is applied to the input terminal 1, this signal is frequency-scanned in the frequency converter 2 and passes through the intermediate frequency amplifier 3 and the frequency detector 4. So the carrier detector 15 judges "there is a signal". As a result, the flip-flop circuit 16 becomes in a suitable condition wherein it is set as soon as it receives a setting signal.

On the other hand, the demodulated base band signal output from the frequency detector 4 is scanned during a portion of the overhead of a packet of a FSK signal. The overhead includes the central frequency. If the base band signal is scanned by a sawtooth voltage, the signal has a level that varies linearly from positive to negative or from negative to positive. This signal is applied to the comparator 5. The comparator 5 produces an output signal which varies from "1" to "0" or from "0" to "1" when the demodulated base band signal passes through 0V (reference voltage), if a reference voltage of the reference voltage generator is 0V. The conversion point detector 17 produces a positive pulse in response to the output voltage from the comparator 5. Therefore, the flip-flop circuit 16 is set by the positive pulse so that the sample & hold circuit 12 holds a sample value of a scanning voltage just before the flip-flop circuit 16 is preset.

Further an output of the switch circuit 14 is switched from an earth potential to the correction signal generating circuit 9 due to preset of the flip-flop circuit 16. Therefore, said overpassing quantity (a correction signal) is added to the scanning voltage by the adder 12 and thus is corrected.

The correction signal of this overpassing quantity (the above mentioned ±P·T) is generated by the correction signal generating circuit 9 which includes the flip-flop circuit 18 and the weighting circuit 19. That is, since a voltage (a signal indicating a scanning direction (speed)) proportional to P is at an output of the comparator 5, this signal is latched in the flip-flop circuit 18 and is held therein until end of the packet. A correction voltage equal to ±PT is obtained by weighting an output signal from the flip-flop circuit 18. The correction voltage is added to the adder 12 through the switch circuit 14 whereby the overpassing quantity is subtracted from the scanning voltage.

As previously described, if a driving voltage for the variable frequency oscillator 13 is E±PT, an accurate correcting operation can be done. Since E is held in the sample & hold circuit 11 and ±PT is held in the correction signal generating circuit 9, accurate demodulation without frequency error can be done with respect to a following packet signal having a duration to issue a center frequency.

Figure 2:
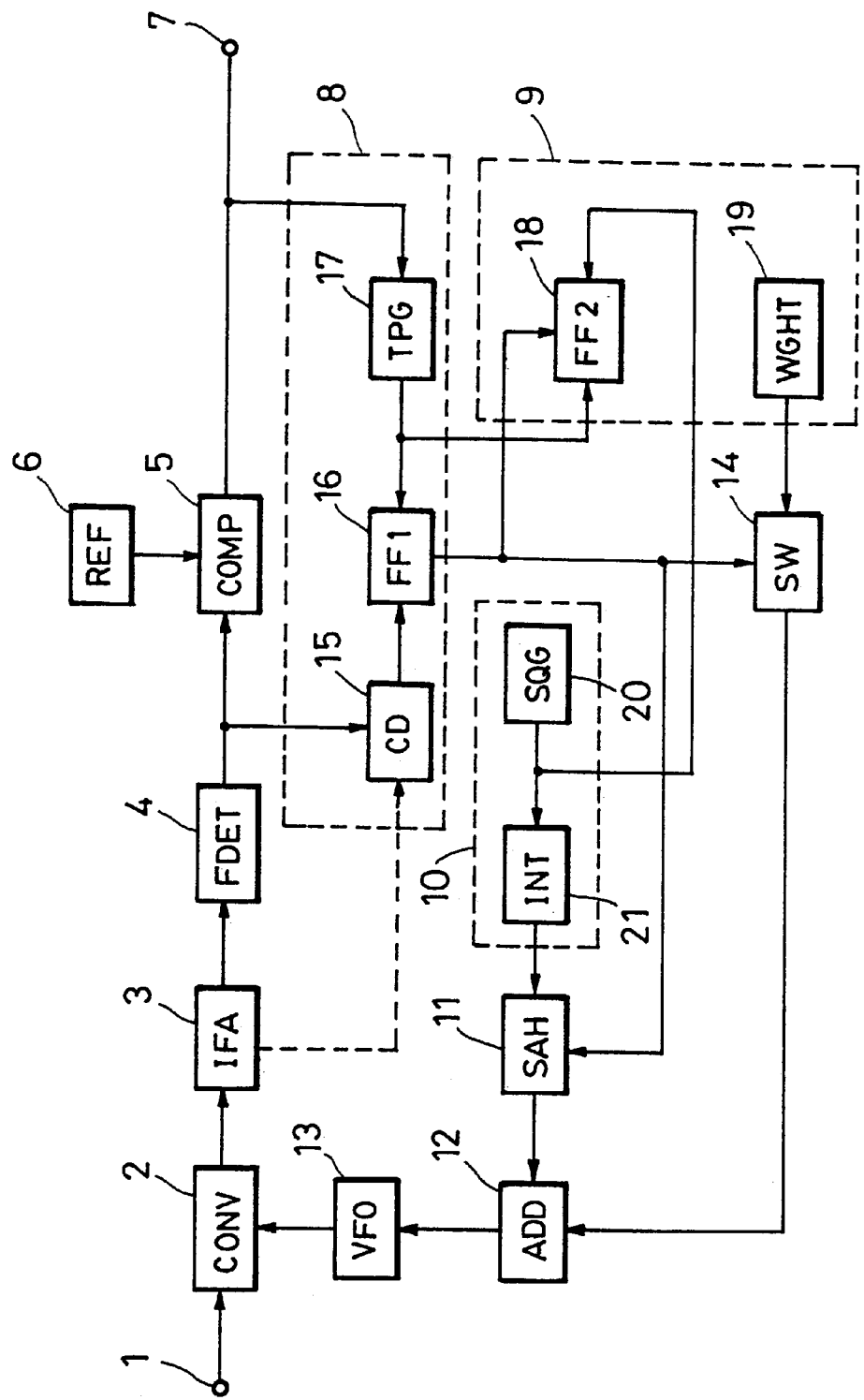
FIG. 2 is a block diagram showing a modification of FIG. 1.

As is apparent from the above explanation, since the flip-flop circuit 18 stores information indicating a scanning direction when a base band signal having a center frequency crosses over a zero point, the information can be obtained from the scanning oscillator directly as shown in FIG. 2, as well as the output of the comparator. In FIG. 2, the scanning oscillator 10 consists of a rectangular wave signal generator (SQG) 20 and an integrator (INT) 21 and an output from SQG 20 is applied to the flip-flop circuit 18.

As explained in detail above, according to the present invention, in a frequency scanning receiver for a FSK signal having a center frequency in a header of a packet, even if scan is considerably fast, a center level error can be corrected accurately to maximize demodulation margin and thus through put of transmission data can be improved.

What is claimed is:

1. A frequency scanning receiver for a FSK signal of packet type having a center frequency in a portion of a head of the packet comprising:

detecting means for detecting a time point when a center level of a demodulated base band signal obtained by demodulating the FSK signal becomes zero;

holding means for holding a scanning voltage to scan the FSK signal at the time point; and correcting means for providing a correction signal having a frequency error of scan corresponding to a loop delay time of a forward loop between an input and an output of the receiver, wherein said detecting means comprises a comparator for comparing the demodulated based band signal with a reference voltage, a carrier detector for detecting the presence of the demodulated base band signal or an intermediate frequency signal, a conversion point detector for detecting inversion of an output of the comparator at the time point, and a flip-flop circuit set by an output of the conversion point detector and reset by an output of the carrier detector provided when there is no demodulated base band signal or the intermediate frequency signal, wherein said holding means includes a hold circuit for holding a sample value of the scanning voltage in response to a set output of said flip-flop circuit, and wherein said correcting means comprises a correcting flip-flop circuit for latching the output of said comparator or a scanning direction signal until end of a packet, a weighting circuit for weighting an output of said correcting flip-flop circuit and an adding circuit for adding an output correcting voltage of said weighting circuit to the scanning voltage.

2. A frequency scanning receiver according to claim 1, comprising a rectangular wave signal generator and an integrator for integrating the rectangular wave signal from said wave signal generator to provide the scanning voltage, the rectangular wave signal being used as said scanning direction signal.

3. A frequency-scanning receiver for a FSK signal of packet type, a portion of a head of a packet storing a center frequency, said frequency-scanning receiver comprising:

a frequency detector for receiving the FSK signal and outputting a demodulated base band signal;

a carrier detector for detecting a demodulated base band signal or an intermediate frequency signal;

a comparator for comparing the demodulated base band signal with a reference voltage;

a conversion point detector for receiving an output from said comparator and detecting inversion of the output of said comparator at a time point when a center level of the demodulated base band signal becomes zero;

a detector flip-flop circuit set by an output of the conversion point detector and reset by an output of the carrier detector when neither of the demodulated base band signal and the intermediate frequency signal is detected, said detector flip-flop circuit providing a set output signal;

a holding circuit for holding a sample value of a scanning voltage to scan the FSK signal at the time point in response to the set output signal of said detector flip-flop circuit;

a correction flip-flop circuit for latching the output of said comparator or a scanning direction signal until the end of a packet of the FSK signal;

a weighting circuit for weighting an output of said correction flip-flop circuit and providing a weighting output signal; and an adding circuit for receiving the weighting output signal from said weighting circuit and the scanning voltage from said holding circuit, said adding circuit providing a corrected scanning voltage to a variable frequency oscillator.

4. The frequency-scanning receiver according to claim 3, comprising a rectangular wave signal generator and an integrator for integrating the rectangular wave signal from said wave signal generator to provide the scanning direction signal.

* * * * *